US012590479B2

(12) United States Patent
Kim et al.

(10) Patent No.: US 12,590,479 B2
(45) Date of Patent: Mar. 31, 2026

(54) DOOR LATCH DEVICE FOR VEHICLE

(71) Applicants: HYUNDAI MOTOR COMPANY, Seoul (KR); Kia Corporation, Seoul (KR); PHA CO., LTD., Daegu (KR)

(72) Inventors: Hyong Don Kim, Yongin-si (KR); Jinwoo Nam, Seoul (KR); Hyun Duk Cho, Daegu (KR); Ki-Ryun Ahn, Daegu (KR)

(73) Assignees: HYUNDAI MOTOR COMPANY, Seoul (KR); Kia Corporation, Seoul (KR); PHA CO., LTD., Daegu (KR)

( * ) Notice: Subject to any disclaimer, the term of this patent is extended or adjusted under 35 U.S.C. 154(b) by 397 days.

(21) Appl. No.: 18/376,974

(22) Filed: Oct. 5, 2023

(65) Prior Publication Data

US 2024/0218712 A1 Jul. 4, 2024

(30) Foreign Application Priority Data

Dec. 29, 2022 (KR) ........................ 10-2022-0189286

(51) Int. Cl.
*E05B 83/38* (2014.01)
*E05B 85/04* (2014.01)

(52) U.S. Cl.
CPC .............. *E05B 83/38* (2013.01); *E05B 85/04* (2013.01); *E05Y 2900/531* (2013.01)

(58) Field of Classification Search
CPC ..... E05B 83/38; E05B 85/04; E05Y 2900/531
See application file for complete search history.

(56) References Cited

U.S. PATENT DOCUMENTS 12,421,773 B2 * 9/2025 Kim ........................ E05B 83/38
2025/0230691 A1 * 7/2025 Kim ........................ E05B 77/00

FOREIGN PATENT DOCUMENTS

KR 100303367 B1 * 9/2001 ............. E05B 85/24

* cited by examiner

*Primary Examiner* — Faye M Fleming
(74) *Attorney, Agent, or Firm* — MORGAN, LEWIS & BOCKIUS LLP

(57) ABSTRACT

A door latch device for a vehicle is disclosed. A door latch device for a vehicle is applied to a vehicle having no B-pillar. The door latch device includes a latch unit and a pop-up guide unit together with a locking unit including a locking claw, a locking claw link, a locking pawl, and a release lever rotatably mounted on the pop-up guide unit so that a striker is locked by the locking claw to prevent the door from rebounding during a swing closing operation of the door.

11 Claims, 17 Drawing Sheets

(S1)

(S2)

(S3)

(S4)

(ST7)

(ST8)

(ST11)

(ST12)

(ST13)

DOOR LATCH DEVICE FOR VEHICLE

CROSS-REFERENCE TO RELATED APPLICATION

The present application claims priority to Korean Patent Application No. 10-2022-0189286 filed on Dec. 29, 2022, the entire contents of which is incorporated herein for all purposes by this reference.

BACKGROUND OF THE PRESENT DISCLOSURE

Field of the Present Disclosure

The present disclosure relates to a door latch device for a vehicle, and more particularly, the present disclosure relates to a door latch device for a vehicle having no B-pillar configured for preventing a door from rebounding during a swing closing operation of the door.

Description of Related Art

In general, a door of a vehicle is a door that separates the inside and the outside of the vehicle, and has an important function for safely protecting occupants by blocking external noise, rain, dust, wind, etc., and absorbing shock together with side structures in case of a side collision.

There are various types of vehicle doors including special-purpose doors, but hinge-type swing doors are most often applied to passenger vehicles.

In general, the swing door refers to a door which is opened outward of a vehicle body about a hinge axis provided through a hinge bracket between the swing door and the vehicle body, and is advantageous in that it is easy to open or close, and it is easy to maintain and repair due to its simple structure.

On the other hand, in some vehicles, opposing-type swing doors are applied. When opened, the opposing-type swing doors give a great sense of openness and are advantageous for passengers to get on or off the vehicles.

These opposing-type swing doors are classified into doors each having a B-pillar and doors each having no B-pillar.

FIG. 1 is a side view illustrating a vehicle to which opposing-type swing doors according to an example of the related art are applied. FIG. 2 is a cross-sectional view illustrating a portion where a front door and a rear door come into contact with each other in the vehicle of FIG. 1.

Referring to FIG. 1 and FIG. 2, the opposing-type swing doors applied to, in particular, a vehicle having no B-pillar include a front door 110 having a hinge axis provided between a vehicle body 100 and a front end of the front door 110, and a rear door 120 having a hinge axis provided between the vehicle body 100 and a rear end of the rear door 120.

Between the opposing-type swing doors, a latch unit LC for keeping the front door 110 or the rear door 120 in a locked state is provided on one side of the front door 110 or the rear door 120.

Furthermore, sealing S for airtightness is provided between a rear end of the front door 110 and a front end of the rear door 120.

The opposing-type swing doors of the vehicle having no B-pillar give a good sense of openness when a passenger gets on or off the vehicle or during leisure activities as described above, but have a disadvantage in that the opening or closing order is determined in advance, for example, the front door 110 needs to be opened first or closed later, because when the front door 110 and the rear door 120 are opened or closed, rotation trajectories overlaps each other between the front door 110 and the rear door 120, which causes an interference problem.

Therefore, because the order in which the front door 110 and the rear door 120 are opened or closed is determined in advance, there is a problem in that it is not possible to open or close the rear door 120 alone.

To solve the foregoing problem of the opposing-type swing doors in the vehicle having no B-pillar, it is a recent trend that the rear door is opened or closed with a double motion including a pop-up operation and a swing operation through a hinge unit.

FIG. 3 is a plan view exemplarily illustrating a door opening or closing operation performed with a double motion on each of the opposing-type swing doors according to an example of the related art.

Referring to FIG. 3, a hinge unit 130 for implementing a double motion is applied to the rear door 120, which is one of the front door 110 disposed at the front of the vehicle and the rear door 120 disposed at the rear of the vehicle. For convenience of understanding, the double motion will be described through the example illustrated in FIG. 3.

That is, step S1 of FIG. 3 illustrates a closed state of the rear door 120, step S2 of FIG. 3 illustrates a pop-up operation in which the rear door 120 slides outward of the rear of the vehicle body 100 by the hinge unit 130, step S3 of FIG. 3 illustrates a swinging operation in which the rear door 120 rotates about the hinge unit 130 after the pop-up operation is completed, and step S4 of FIG. 3 illustrates a fully opened state of the rear door 120.

FIG. 4 is a perspective view of the rear door, which is one of the opposing-type swing doors according to an example of the related art. FIG. 5 is a view illustrating step-by-step operation states for explaining a problem of a door latch device for a vehicle according to an example of the related art.

Referring to FIG. 4, a door latch device 140 is disposed on one lower front side of the rear door 120, which is one of the opposing-type swing doors.

That is, the door latch device 140 operates with respect to a striker 150 fixed to one side of the vehicle body to keep the door in a locked state.

Referring to FIG. 5, the door latch device 140 includes: a striker 150 fixed to one side of the vehicle body; a latch unit 160 disposed on one lower side of the door to restrain the striker 150 or release the restraint of the striker 150 through a claw lever 163 and a pawl lever 165 on a body 161; and a pop-up guide unit 170 constituted by first and second guiders 173 and 175 integrally formed on one side of the body of the latch unit 160 to form a guide groove 171 at a preset angle so that the striker 150 is guided along the one lower side of the door during a pop-up operation of the door.

At the present time, a switch 179 and a switch lever 177 may be provided on the first guider 173 of the pop-up guide unit 170 to check whether a swinging operation of the door has been completed.

In the present way, in the door latch device 140 according to the related art, during a swing closing operation of the door as in step S11 of FIG. 5, the striker 150 operates the switch 179 through the switch lever 177 as in step S12 of FIG. 5 so that it is recognized that the swing closing operation of the door has been completed.

However, when the door is closed hard with excessive force, the door rebounds outwardly from the striker 150 due to a repulsive force of a weather strip or the like, and the striker 150 is not located in the guide groove 171 of the pop-up guide unit 170 in an abnormal state.

Nevertheless, a controller recognizes that the swing closing operation of the door has been completed, and abnormally proceeds with a pop-up operation, which causes a problem such as damage to the door latch device 140, the hinge unit 130, or the door.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door latch device for a vehicle including no B-pillar, the door latch device including a locking unit that includes a locking claw, a locking claw link, a locking pawl, and a release lever on a pop-up guide unit so that a striker is locked by the locking claw to prevent the door from rebounding during a swing closing operation of the door.

A door latch device for a vehicle according to one or more exemplary embodiments of the present disclosure includes: a striker fixed to a vehicle body to correspond to one lower side of a door which is opened or closed with a double motion including a pop-up operation and a swing operation through a hinge unit; a latch unit disposed on the one lower side of the door to restrain the striker or release the restraint of the striker through a claw lever and a pawl lever rotatably mounted on a body; and a pop-up guide unit including a guide groove formed by a guider including first and second guiders formed on one side of the body to guide the striker along the one lower side of the door during the pop-up operation of the door, wherein the door latch device further includes a locking unit including a locking claw, a locking claw link, a locking pawl, and a release lever rotatably mounted on the pop-up guide unit to lock the striker in a rebound direction through the locking claw when the striker enters the pop-up guide unit during a swing closing operation of the door.

In the locking unit: the locking claw may be pin-coupled to one side of the first guider of the pop-up guide unit, and include a locking end portion formed on a first side thereof to lock the striker and a locking-caught end portion formed on a second side thereof to restrict rotation of the locking claw in one direction, with a link pin provided adjacent to the locking-caught end portion in a cross-sectional view of the locking claw; the locking claw link may be disposed above the locking claw, and be pin-coupled to the one side of the first guider together with the locking claw while one side of the locking claw link is supported by the link pin; the locking pawl may be pin-coupled to the other side of the first guider to correspond to the one side of the locking claw, and include a locking support end portion formed on one side thereof to act on the locking-caught end portion and first and second contact end portions supported in both directions by a fixed damper on both opposite sides of the locking support end; and the release lever may be pin-coupled to the one side of the locking pawl, protrude toward the guide groove of the pop-up guide unit on one side thereof so that the release lever is operated by the striker, and include a lever end portion formed on the other side thereof to act on the second contact end portion.

The locking claw link may form a locking groove together with the locking end portion of the locking claw when facing an entrance portion of the guide groove.

The locking claw may include a switch operation end portion protruding on the opposite side of the locking end portion to operate a switch on the pop-up guide unit.

The locking unit may further include: a locking claw spring fitted onto the pin of the locking claw under the first guider to elastically support the locking claw in both directions; a locking pawl spring fitted onto the pin of the locking pawl under the first guider to elastically support the locking pawl in a direction in which the locking support end portion of the locking pawl supports the locking-caught end portion of the locking claw; a link spring fitted onto the pin of the locking claw on the locking claw link to elastically support the locking claw link toward the link pin with respect to the locking claw; and a lever spring fitted onto the pin of the release lever on the release lever to elastically support the release lever in a direction in which one side of the release lever protrudes toward the guide groove.

In a state where the link spring is fitted onto the pin of the locking claw, one end portion of the link spring may be supported by the one side of the locking claw, and the other end portion of the link spring may be supported by a spring support end portion formed in the locking claw link.

In a state where the lever spring is fitted onto the pin of the release link, one end portion of the lever spring may be supported by the second contact end portion of the locking pawl, and the other end portion of the lever spring may be inserted into a spring hole formed in a cross-sectional view of the release lever.

The locking unit may further include: a locking claw damper provided on the first guider while supporting the one side of the locking claw to suppress rotation; and a locking pawl damper provided on the first guider to correspond between the first and second contact end portions of the locking pawl.

In the locking unit, the release lever may be disposed above the locking pawl and pin-coupled to the other side of the first guider together with the locking pawl, a locking handle wire may be connected to one side of the release lever, and the release lever may include a lever end portion formed on the other side thereof to act on the first contact end portion.

The one lower side of the door may be one lower front side of a rear door.

According to the exemplary embodiments of the present disclosure, by arranging the locking unit including a locking claw lever, a locking pawl lever, and a locking pawl link lever on the pop-up guide unit in the vehicle having no B-pillar, when the door is closed in the swing operation, the locking end portion of the locking claw lever locks the striker so that the door may be prevented in advance from rebounding.

Even when the door is closed hard with excessive force, the striker slides along the guide groove of the pop-up guide unit in a locked state in the locking groove of the locking claw lever, so that the door can proceed with a normal pop-up closing operation.

Accordingly, it is possible to prevent damage to the door latch device and damage to the hinge unit or the door caused by an abnormal operation, such as a rebound phenomenon, of a conventional swing door.

Furthermore, effects which may be obtained or predicted according to the exemplary embodiments of the present disclosure will be directly or implicitly included in the detailed description of the exemplary embodiments of the present disclosure. That is, various effects predicted according to the exemplary embodiments of the present disclosure will be included within the detailed description to be provided below.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION

Figure 12:
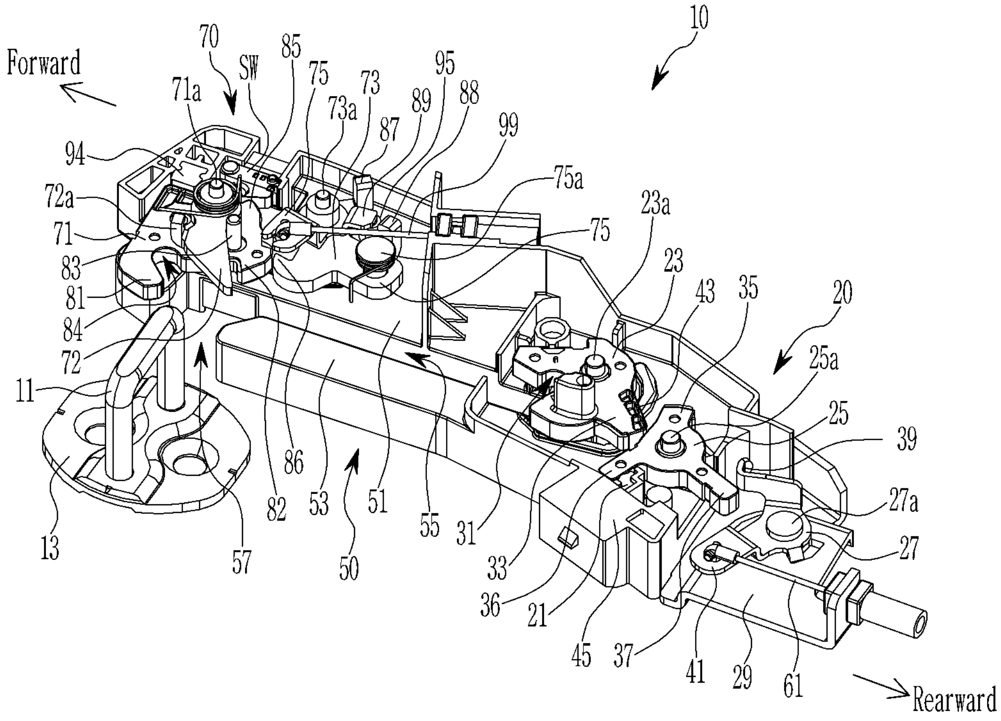
Figure 13:
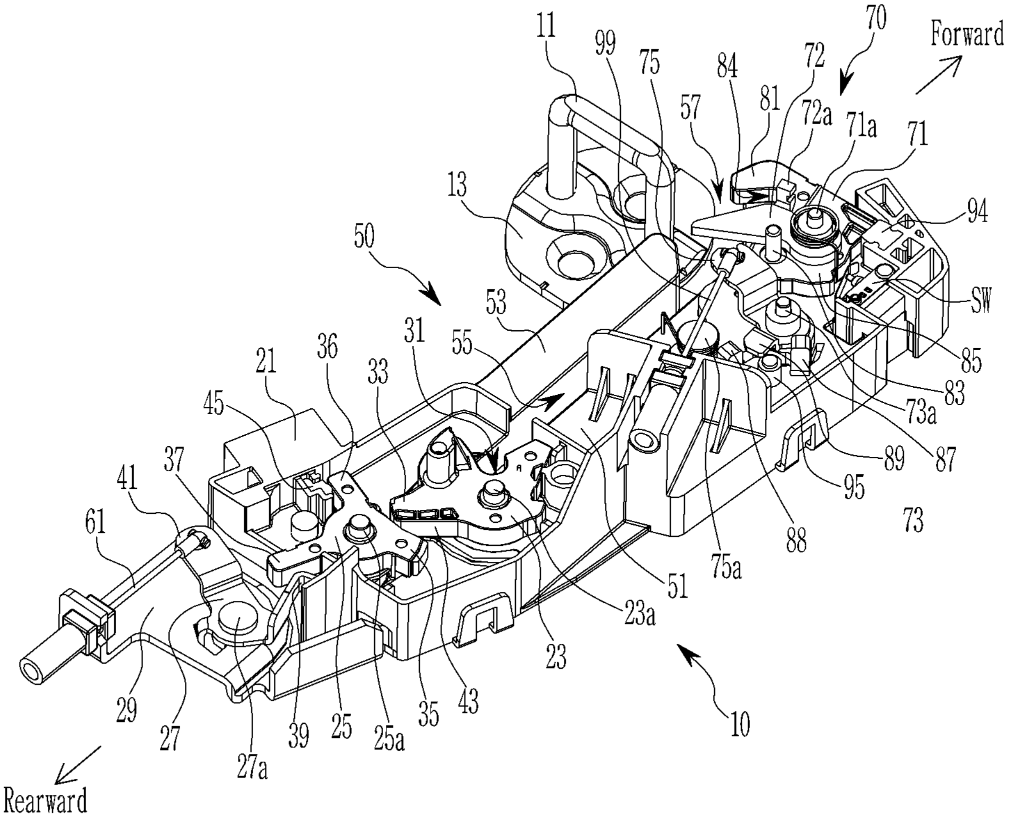

FIG. 12, and FIG. 13 are perspective views exemplarily illustrating a door latch device for a vehicle according to various exemplary embodiments of the present disclosure.

Figure 14:
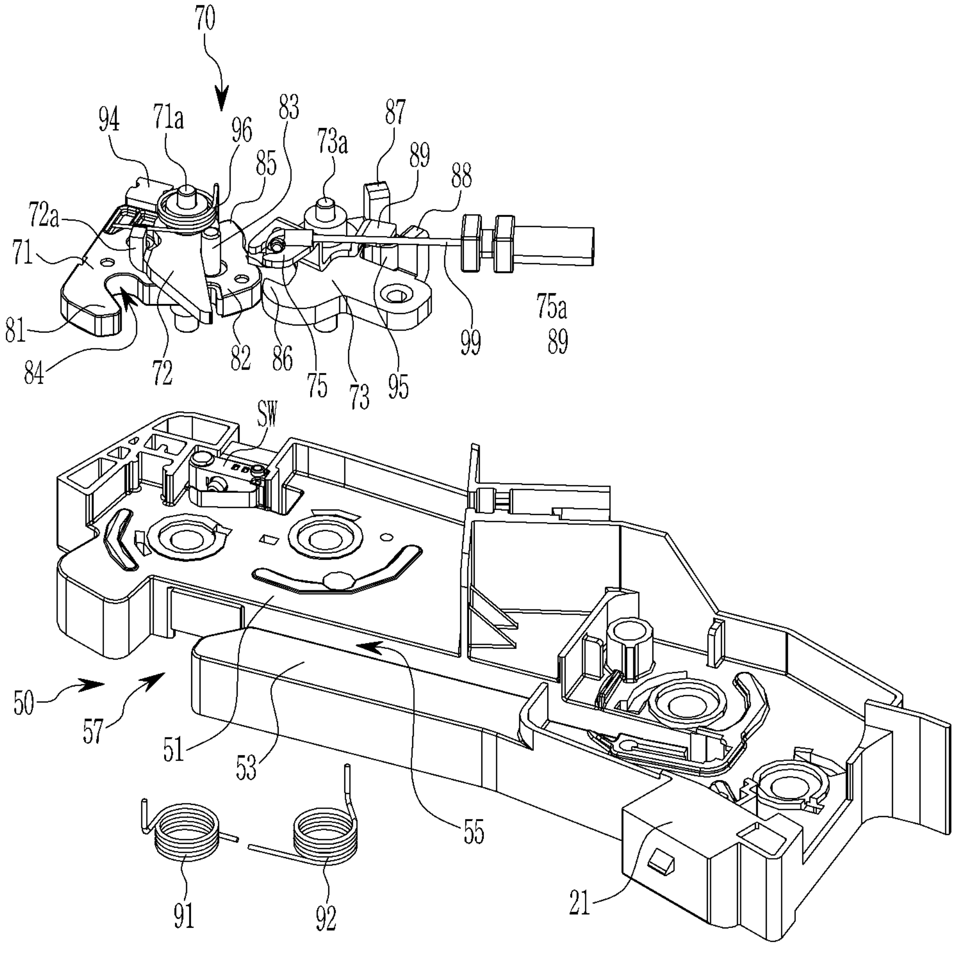

FIG. 14 is a perspective view exemplarily illustrating a locking unit applied to the door latch device for the vehicle according to the various exemplary embodiments of the present disclosure.

Figure 15:
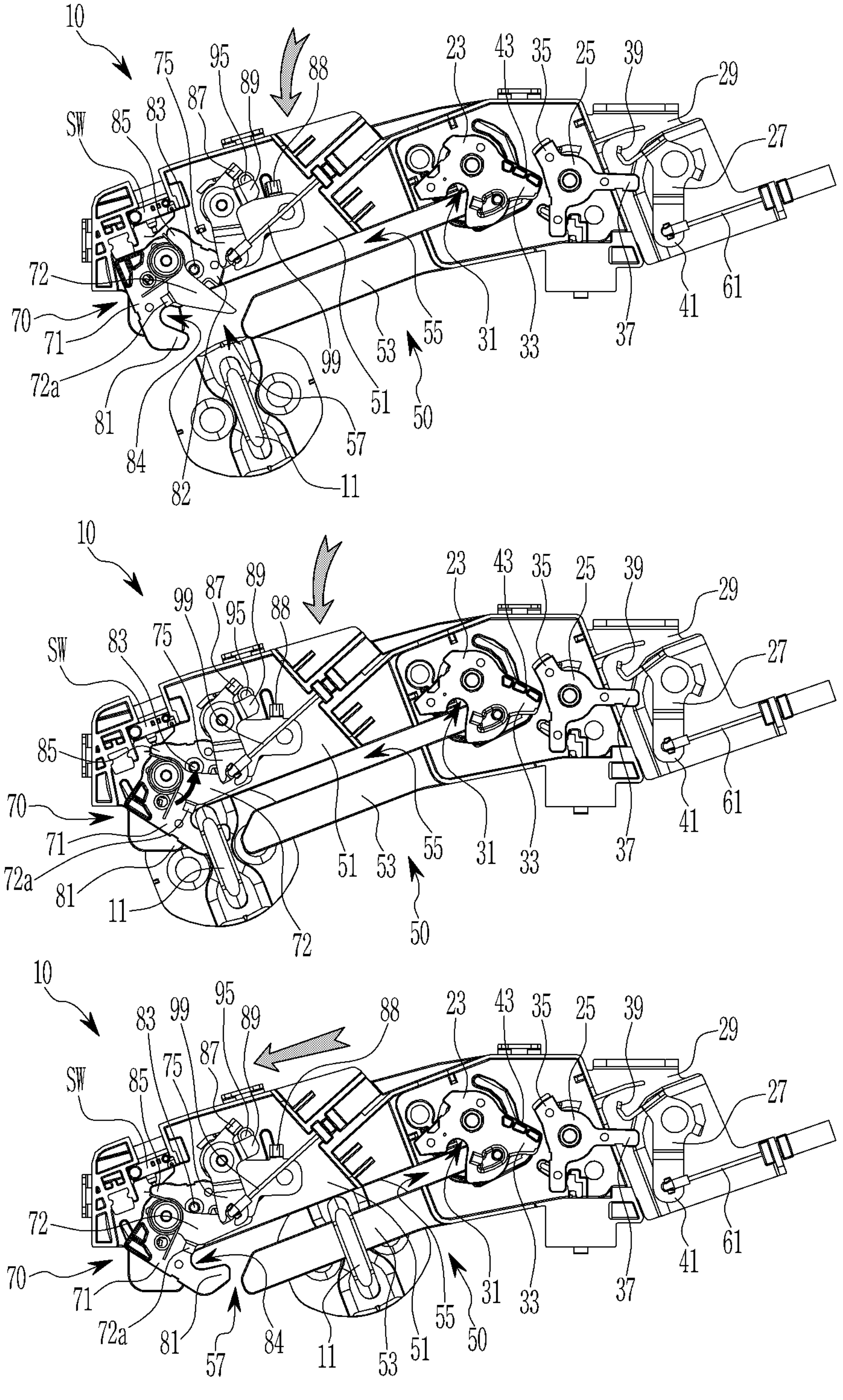
Figure 16:
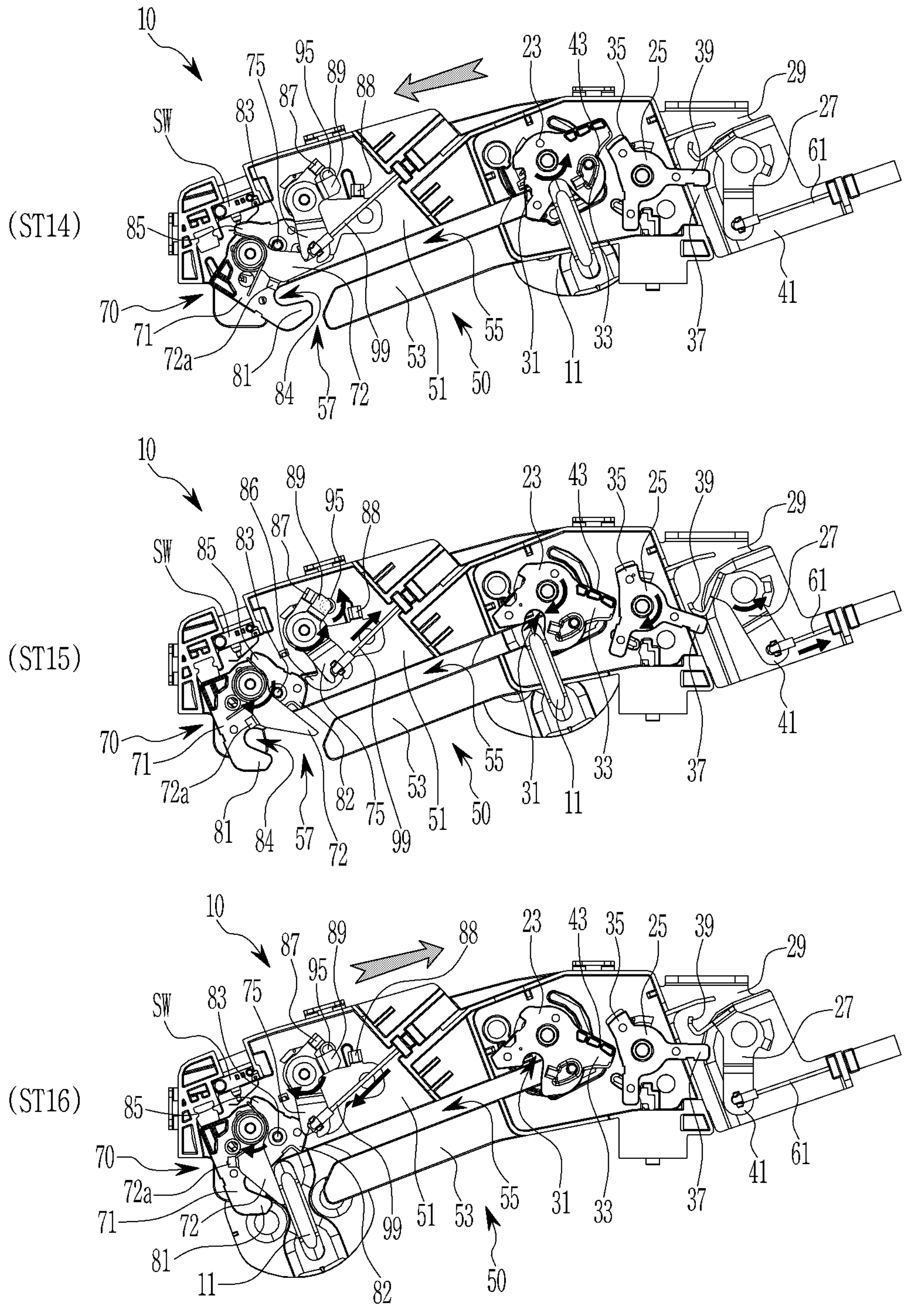
Figure 17:
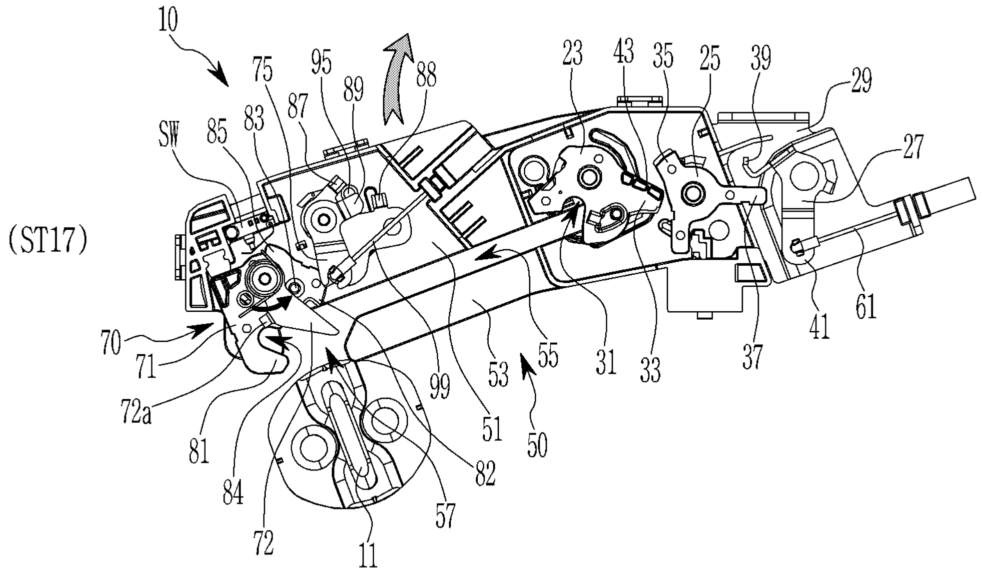

FIG. 15, FIG. 16 and FIG. 17 are plan views exemplarily illustrating step-by-step operation states of the door latch device for the vehicle according to the various exemplary embodiments of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings.

However, because respective sizes and thicknesses of components shown in the drawings are arbitrarily shown for convenience of explanation, the present disclosure is not necessarily limited to what are shown in the drawings, and the thicknesses are enlarged or reduced to clearly express several parts and regions. Furthermore, to clearly describe the exemplary embodiments of the present disclosure, parts irrelevant to the description are omitted.

Figure 1:
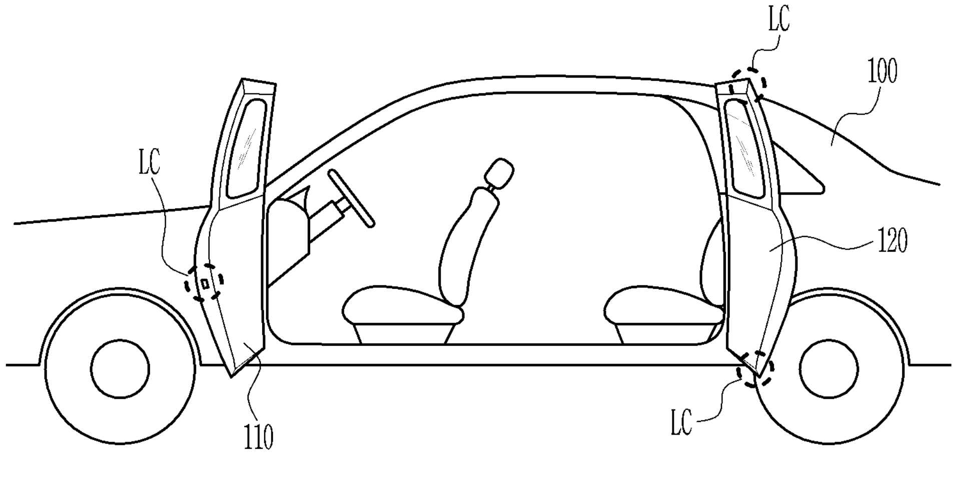
FIG. 1 is a side view exemplarily illustrating a vehicle to which opposing-type swing doors according to an example of the related art are applied.
Figure 2:
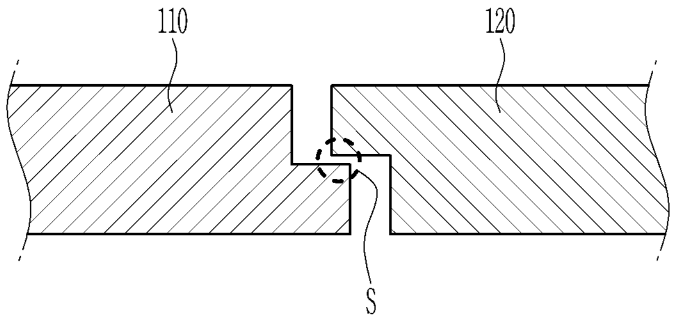
FIG. 2 is a cross-sectional view exemplarily illustrating a portion where a front door and a rear door come into contact with each other in the vehicle of FIG. 1.
Figure 3:
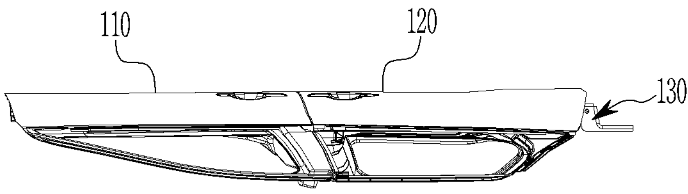
FIG. 3 is a plan view exemplarily illustrating a door opening or closing operation performed with a double motion on each of the opposing-type swing doors according to an example of the related art.
Figure 3:
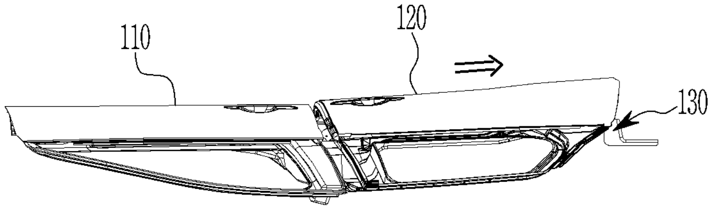
Figure 3:
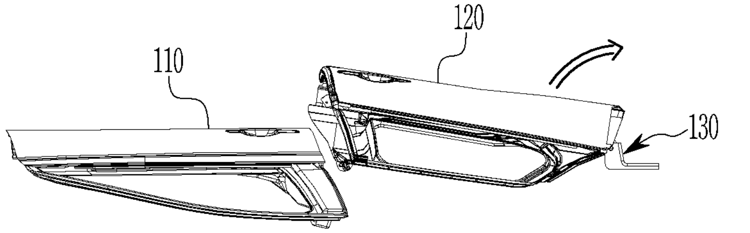
Figure 3:
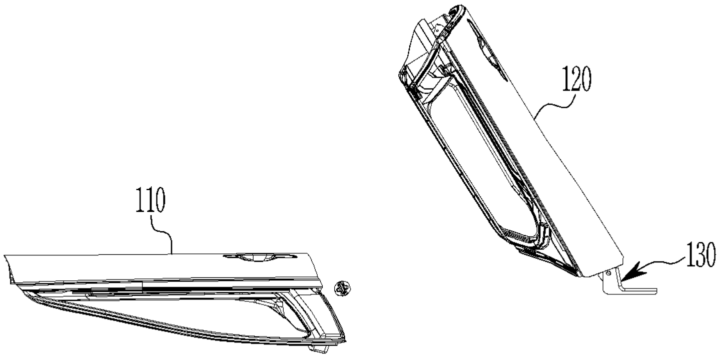
Figure 4:
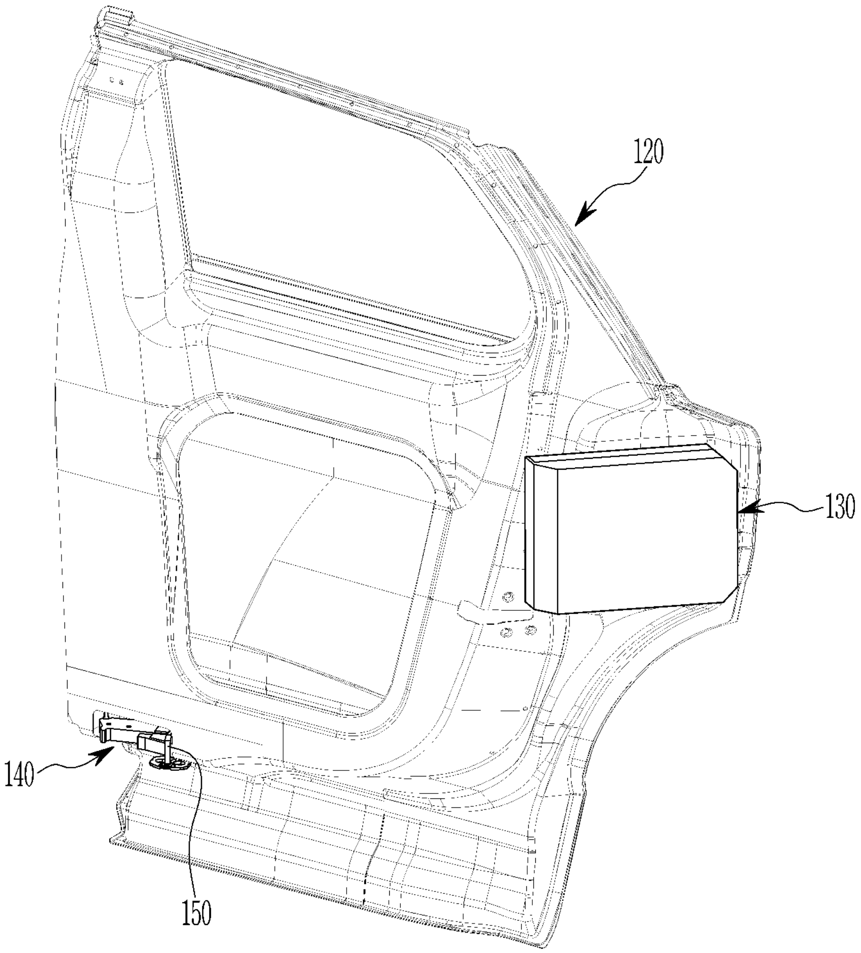
FIG. 4 is a perspective view of the rear door, which is one of the opposing-type swing doors according to an example of the related art.
Figure 5:
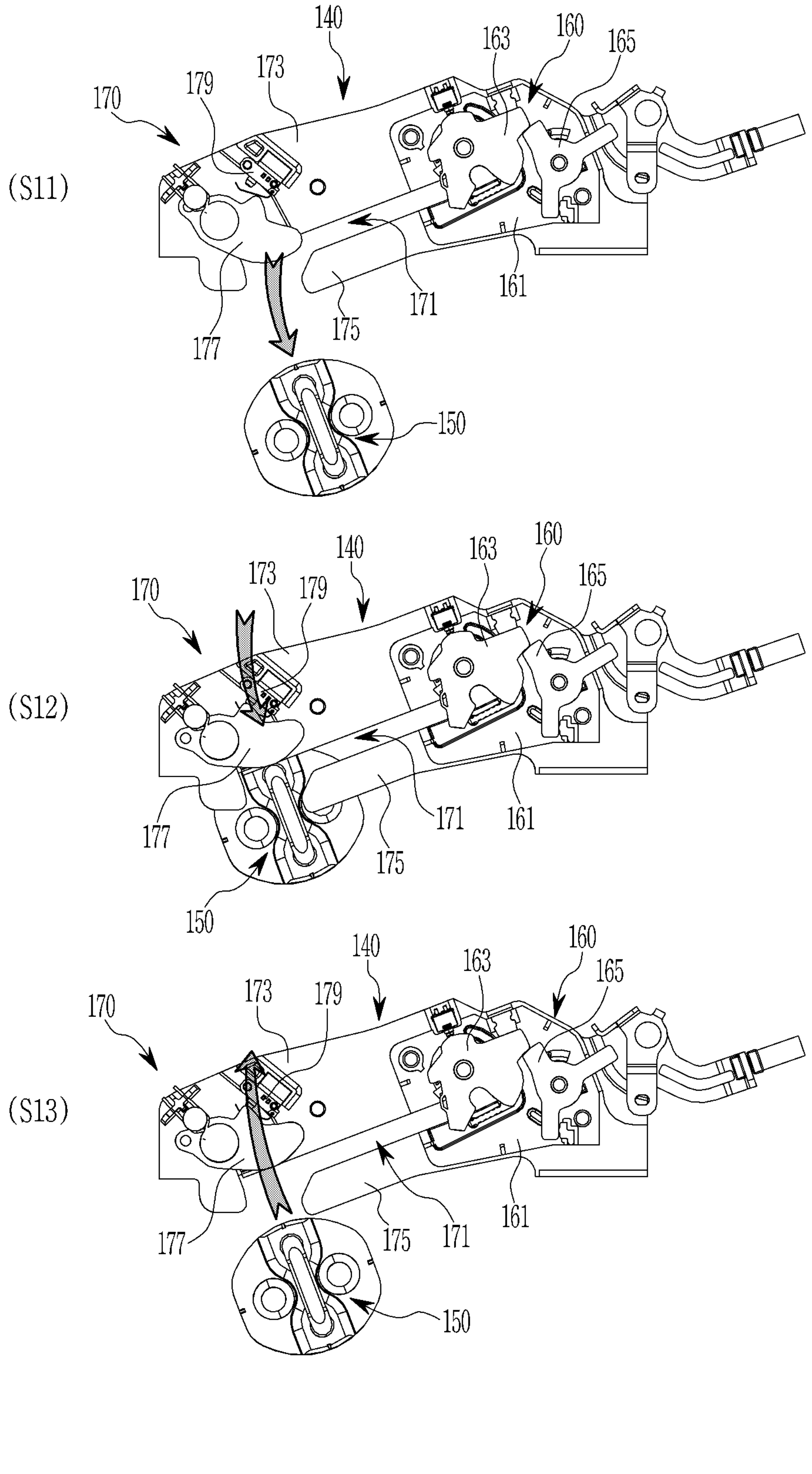
FIG. 5 is a view exemplarily illustrating step-by-step operation states for explaining a problem of a door latch device for a vehicle according to an example of the related art.
Figure 6:
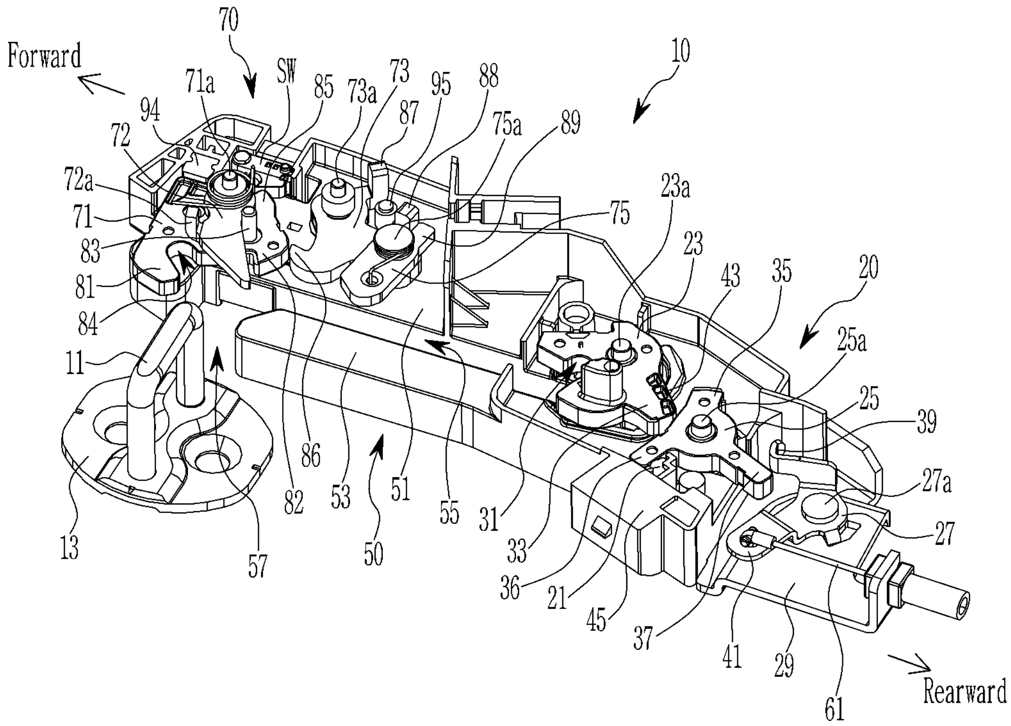
FIG. 6 and FIG. 7 are perspective views exemplarily illustrating a door latch device for a vehicle according to various exemplary embodiments of the present disclosure.

In describing the exemplary embodiments of the present disclosure, for convenience of description, the upper left portion of FIG. 6 is defined as the front and the lower right portion of FIG. 6 is defined as the rear. Furthermore, a door latch device for a vehicle according to an exemplary embodiment of the present disclosure is preferably provided on each of both rear doors behind a driver's seat and a front passenger seat of a vehicle. In the exemplary embodiment of the present disclosure, an example in which the door latch device is applied to the rear door behind the front passenger seat will be described.

Figure 7:
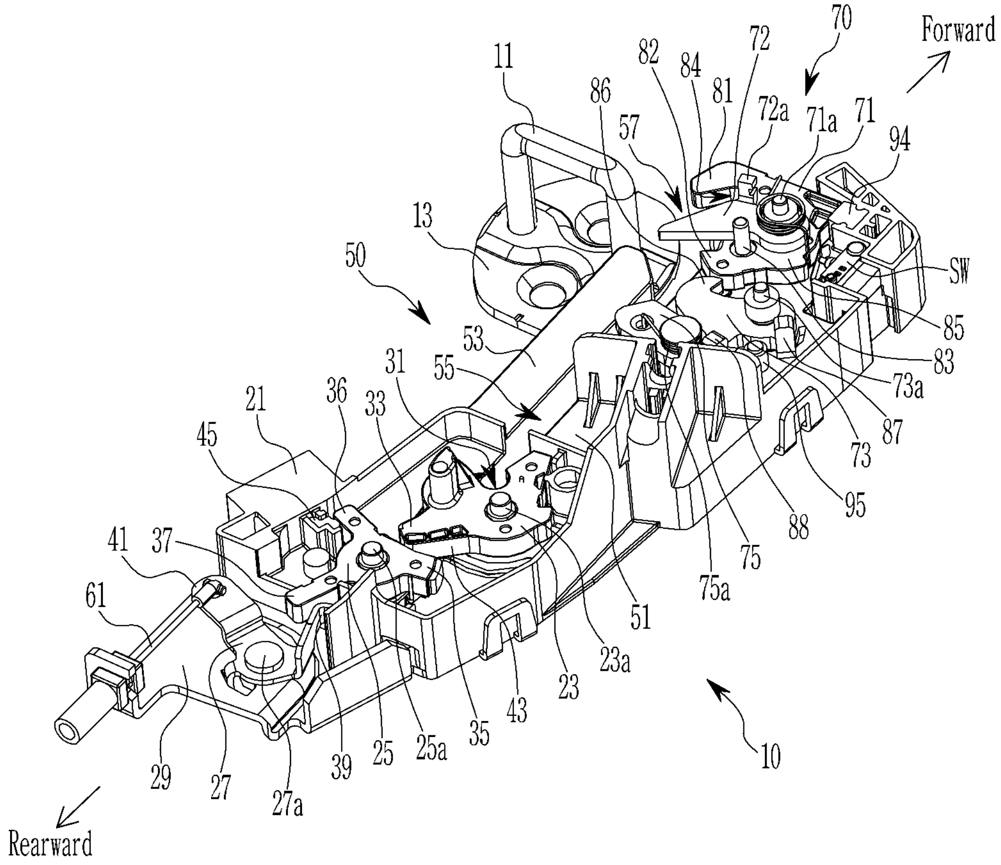
Figure 8:
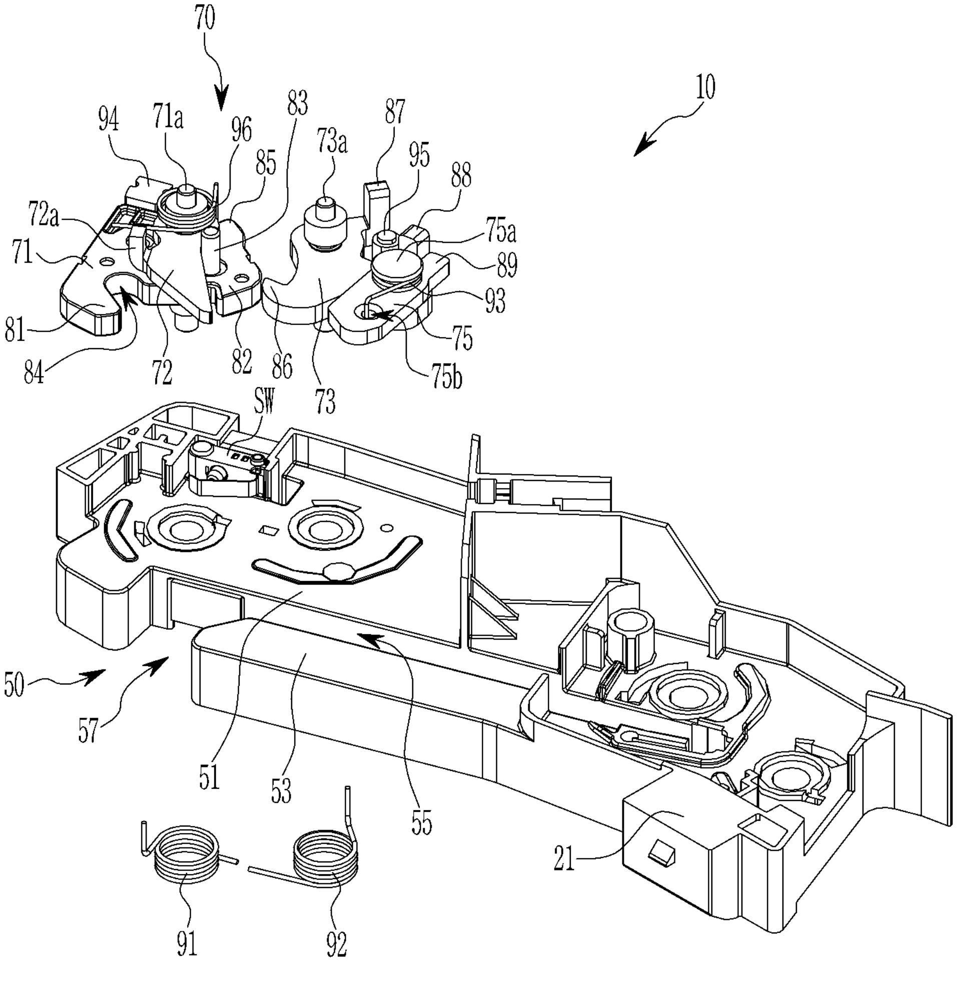
FIG. 8 is a perspective view exemplarily illustrating a locking unit applied to the door latch device for the vehicle according to the various exemplary embodiments of the present disclosure.

FIG. 6 and FIG. 7 are perspective views exemplarily illustrating a door latch device for a vehicle according to various exemplary embodiments of the present disclosure. FIG. 8 is a perspective view exemplarily illustrating a locking unit applied to the door latch device for the vehicle according to the various exemplary embodiments of the present disclosure.

The door latch device 10 for the vehicle according to the various exemplary embodiments of the present disclosure may be applied to a rear door of a passenger vehicle having no B-pillar. That is, the door latch device 10 for the vehicle may be disposed between one lower front side of the rear door which is opened or closed with a double motion including a pop-up operation and a swing operation through a hinge unit and a corresponding vehicle body.

Referring to FIGS. 6 to 8, the door latch device 10 for the vehicle according to the various exemplary embodiments of the present disclosure may include a striker 11, a latch unit 20, a pop-up guide unit 50, and a locking unit 70.

The striker 11 is fixed to the vehicle body through a bracket 13 corresponding to one lower front side of the rear door which is opened or closed with a double motion including a pop-up operation and a swing operation through the hinge unit.

The latch unit 20 is disposed on one lower front side of the rear door, and is configured to keep the rear door in the closed state or open the rear door by restraining the striker 11 or releasing the restraint of the striker 11 through a claw lever 23 and a pawl lever 25 on a body 21.

The latch unit 20 includes a body 21, a claw lever 23, a pawl lever 25, and an operation lever 27.

That is, a cutout portion is formed on one lower front side of an internal panel of the rear door, and the latch unit 20 is provided in the cutout portion to act on the striker 11 on the vehicle body.

The body 21 is fixed inside the cutout portion on one lower front side of the rear door, and a connection bracket 29 is mounted under the body 21.

The claw lever 23 is provided on the body 21 to be rotatable through a first pin 23*a* to correspond to the pop-up guide unit 50.

Furthermore, a restraining groove 31 for restraining the striker 11 is formed on one side of the claw lever 23, and a catching end portion 33 protruding for restricting rotation in one direction is formed on the other side of the claw lever 23.

The pawl lever 25 is provided on the body 21 to be rotatable through a second pin 25*a* to correspond to one side of the claw lever 23.

Furthermore, the pawl lever 25 includes a support end portion 35 acting on the catching end portion 33 on one side thereof and a release end portion 37 protruding on the other side thereof.

Furthermore, the pawl lever 25 includes a protruding end portion 36 protruding on the opposite side of the support end portion 35 and the release end portion 37 to suppress rotation of the pawl lever 25 in one direction thereof.

The operation lever 27 is provided to be rotatable through a third pin 27*a* on the connection bracket 29 fixed under the body 21.

Furthermore, the operation lever 27 includes an operation end portion 39 acting on the release end portion 37 of the pawl lever 25 on one side thereof and a connection end portion 41 connected to a latch handle wire 61 on the other side thereof.

The latch unit 20 further includes a claw damper 43 and a pawl damper 45.

The claw damper 43 is formed on an external side surface of the catching end portion 33 of the claw lever 23 and supported by one side of the body 21 to suppress rotation in one direction while reducing contact noise.

The pawl damper 45 is provided on the other side of the body 21 to correspond to one side surface of the protruding end portion 36 of the pawl lever 25, and supports the protruding end portion 36 of the pawl lever 25 to suppress rotation in one direction while reducing contact noise.

A claw spring fitted onto the first pin 23*a* of the claw lever 23 may be provided under the body 21 to elastically support the claw lever 23 in a direction to release the restraint of the striker 11.

Furthermore, a pawl spring fitted onto the second pin 25*a* of the pawl lever 25 may be provided under the body 21 to elastically support the pawl lever 25 in a direction in which the support end portion 35 of the pawl lever 25 supports the catching end portion 33 of the claw lever 23.

The pop-up guide unit 50 is integrally formed on the front side of the body 21 of the latch unit 20 to guide the striker 11 along one lower front side of the rear door during a pop-up operation of the rear door.

The pop-up guide unit 50 is formed on the front side of the body 21 in a form of a guider including first and second guiders 51 and 53.

That is, in the guider, the first guider 51 is integrally formed on one front side of the body 21, and the second guider 53 is integrally formed on the other front side of the body 21, with a guide groove 55 formed with a predetermined distance between the first guider 51 and the second guider 53.

In the guide groove 55, a distance between the first and second guiders 51 and 53 at an entrance portion 57 of the guide groove 55 is greater than the predetermined distance, so that the striker 11 can easily enter the pop-up guide unit 50.

Here, the first guider 51 is formed to be longer than the second guider 53 so that the entrance portion 57, through which the striker 11 enters the pop-up guide unit 50, faces the outside of the vehicle body.

Furthermore, the locking unit 70 is disposed on the first guider 51 of the pop-up guide unit 50, so that when the rear door is closed in a swing operation, the rear door is prevented from rebounding outwardly from the striker 11 even when a greater force than necessary is applied.

The locking unit 70 includes a locking claw 71, a locking claw link 72, a locking pawl 73, and a release lever 75. That is, when the striker 11 enters the pop-up guide unit 50 while the rear door is closed in a swinging operation, the locking claw 71 locks the striker 11 to prevent the rear door from escaping in a rebound direction thereof.

The locking claw 71 is provided to be rotatable through a fourth pin 71*a* on one front side of the first guider 51 of the pop-up guide unit 50.

The locking claw 71 includes a locking end portion 81 formed on one side thereof to lock the striker 11 and a locking-caught end portion 82 formed on the other side thereof to restrict rotation in one direction thereof.

Furthermore, a link pin 83 is provided in a vertical direction in a cross-sectional view of the locking claw 71 to be adjacent to the locking-caught end portion 82.

The locking claw 71 includes a switch operation end portion 85 protruding on the opposite side of the locking end portion 81, and the switch operation end portion 85 operates a switch SW provided on the first guider 51 of the pop-up guide unit 50 to recognize that the swing operation of the striker 11 has been completed.

The locking claw link 72 is disposed above the locking claw 71 and is provided to be rotatable together with the locking claw 71 through the fourth pin 71*a* on one front side of the first guider 51.

At the present time, one side of the locking claw link 72 is supported by the link pin 83 in a rotation direction thereof.

Furthermore, the locking claw link 72 forms a locking groove 84 together with the locking end portion 81 of the locking claw 71 when facing the entrance portion 57 of the guide groove 55 of the pop-up guide unit 50, so that the striker 11 is accommodated to lock the striker 11 when the striker 11 enters the pop-up guide unit 50.

The locking pawl 73 is provided to be rotatable through a fifth pin 73*a* on the other side of the first guider 51 of the pop-up guide unit 50 to correspond to one side of the locking claw 71.

The locking pawl 73 includes a locking support end portion 86 protruding on one side thereof to act on the locking-caught end portion 82, and first and second contact end portions 87 and 88 supported in both directions by a locking pawl damper 95 fixed to the first guider 51 on both opposite sides of the locking support end portion 86.

The release lever 75 is provided to be rotatable through a sixth pin 75*a* on one side of the locking pawl 73.

Furthermore, the release lever 75 protrudes toward the guide groove 55 of the pop-up guide unit 50 on one side thereof so that the release lever 75 is operated by the striker 11 during a pop-up closing operation with respect to the striker 11, and the release lever 75 includes a lever end portion 89 protruding on the other side thereof to act on the second contact end portion 88.

That is, during a pop-up closing operation of the rear door, when one side of the release lever 75 is pushed backward and rotated by the striker 11, the lever end portion 89 pushes the second contact end portion 88 of the locking pawl 73 to rotate the locking pawl 73 in a direction in which the locking support end portion 86 of the locking pawl 73 releases the support of the locking-caught end portion 82 of the locking claw 71.

Conversely, during a pop-up opening operation of the rear door, when the release lever 75 is pushed forward and rotated by the striker 11, the lever end portion 89 rotates in a direction opposite to the second contact end portion 88 regardless of the rotation of the locking pawl 73.

The locking unit 70 further includes a locking claw spring 91, a locking pawl spring 92, a link spring 96, and a lever spring 93.

The locking claw spring 91 is fitted onto the fourth pin 71*a* of the locking claw 71 under the first guider to elastically support the locking claw 71 in both directions.

The locking pawl spring 92 is fitted onto the fifth pin 73*a* of the locking pawl 73 under the first guider to elastically support the locking pawl 73 in a direction in which the locking support end portion 86 of the locking pawl 73 catches and supports the locking-caught end portion 82 of the locking claw 71.

The link spring 96 is fitted onto the fourth pin 71*a* of the locking claw 71 on the locking claw link 72 to elastically support the locking claw link 72 toward the link pin 83 with respect to the locking claw 71.

That is, one end portion of the link spring 96 is supported by one side of the locking claw 71, and the other end portion of the link spring 96 is supported by a spring support end portion 72*a* formed in the locking claw link 72.

The lever spring 93 is fitted onto the sixth pin 75*a* of the release lever 75 on the release lever 75 to elastically support the release lever 75 in a direction in which one side of the release lever 75 protrudes toward the guide groove 55.

That is, one end portion of the lever spring 93 is supported by the second contact end portion 88 of the locking pawl 73, and the other end portion of the lever spring 93 is inserted into a spring hole 75*b* formed in a cross-sectional view of the release lever 75 to elastically support the release lever 75.

Furthermore, the locking unit 70 further includes a locking claw damper 94 and a locking pawl damper 95.

The locking claw damper 94 is provided on one side of the first guider 51 of the pop-up guide unit 50 to support one side of the locking claw 71, to restrict rotation of the locking claw 71 in one direction while reducing contact noise.

The locking pawl damper 95 is provided on the first guider 51 to correspond between the first and second contact end portions 87 and 88 of the locking pawl 73, to restrict rotation of the locking pawl 73 in both directions while reducing contact noise when contacting with the first and second contact end portions 87 and 88.

Hereinafter, a step-by-step operation of the door latch device for the vehicle according to the various exemplary embodiments of the present disclosure will be described with reference to FIGS. 9 to 11.

Figure 9:
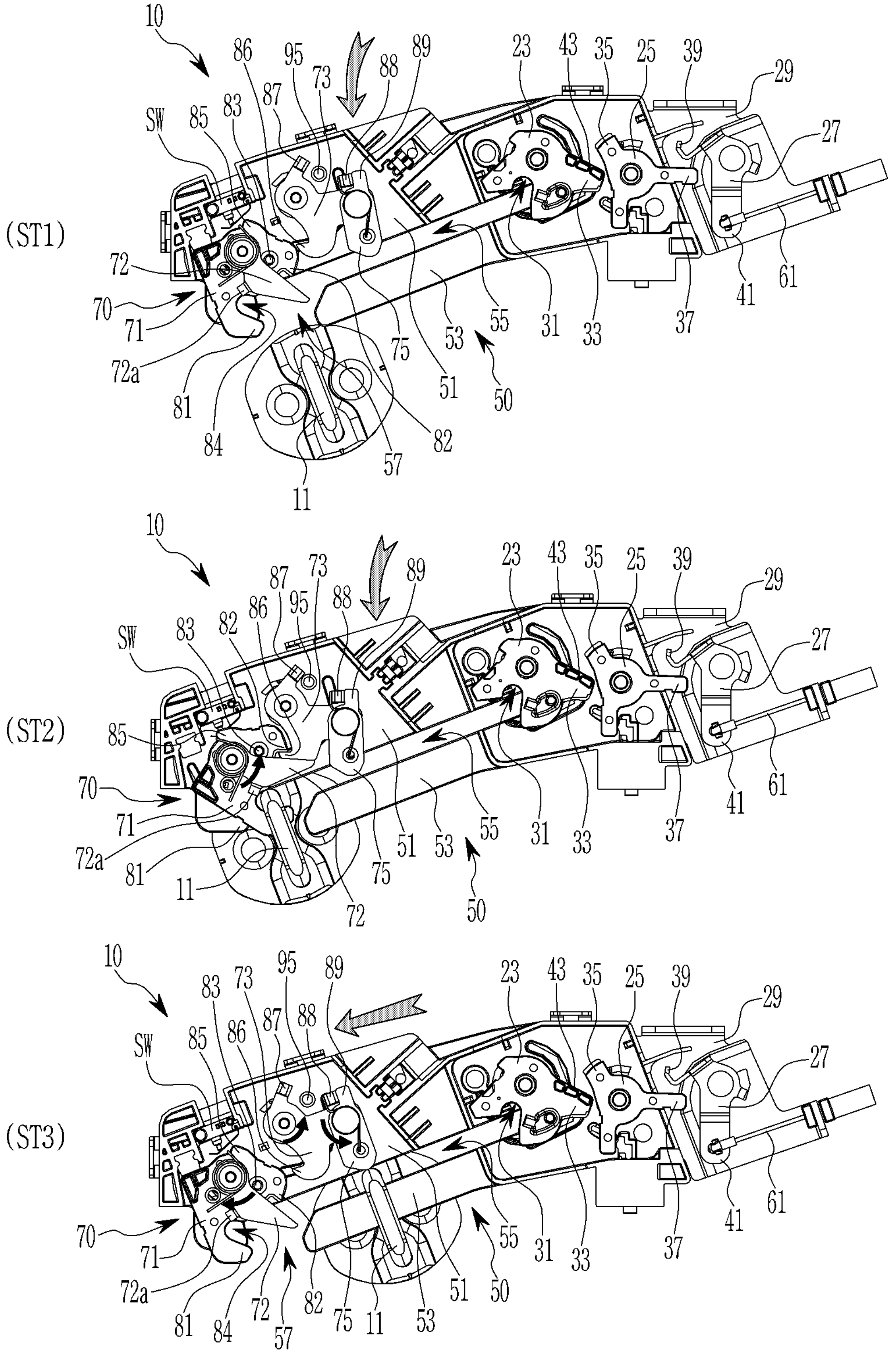
FIG. 9, FIG. 10 and FIG. 11 are plan views exemplarily illustrating step-by-step operation states of the door latch device for the vehicle according to the various exemplary embodiments of the present disclosure.
Figure 10:
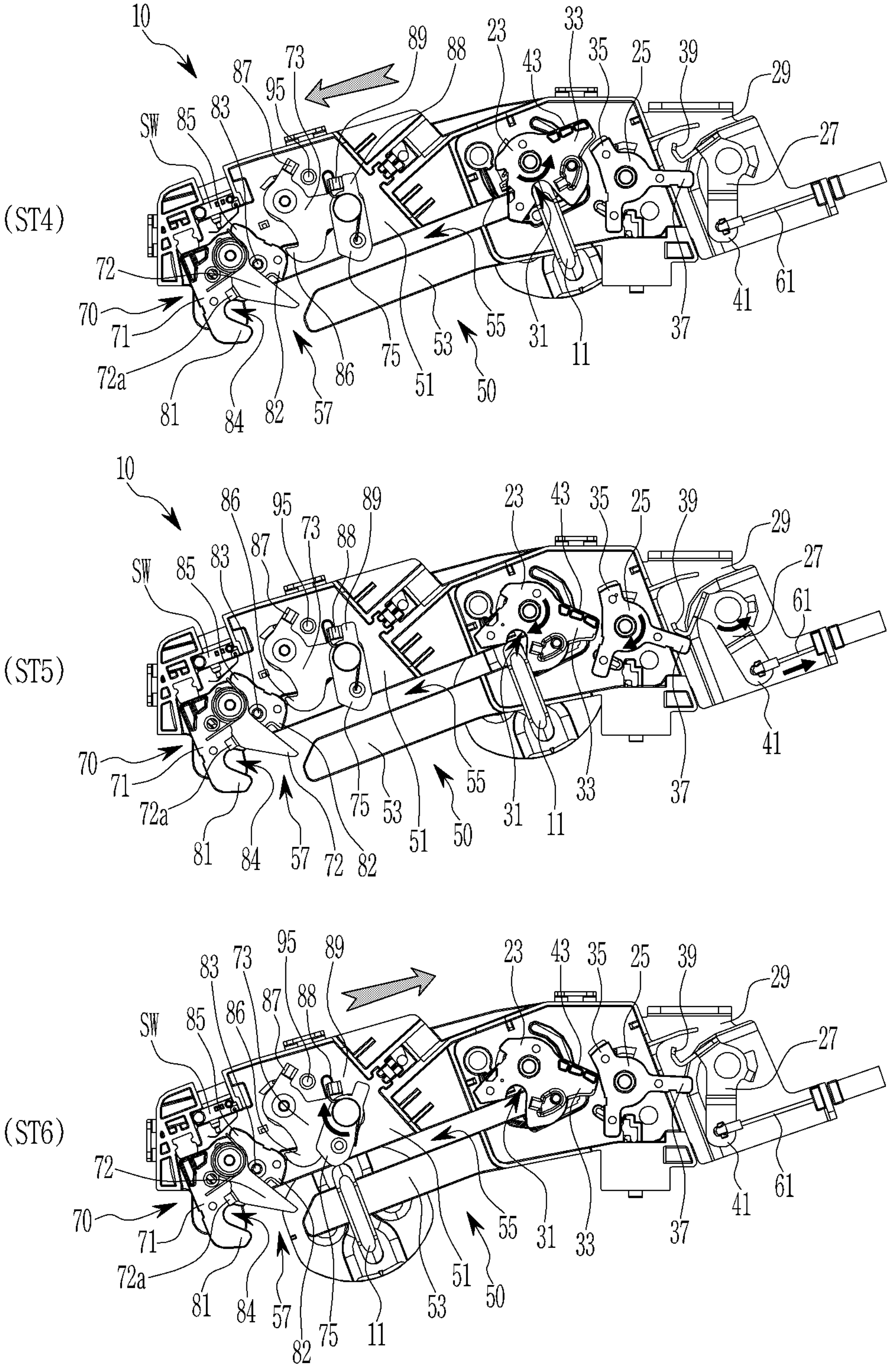
Figure 11:
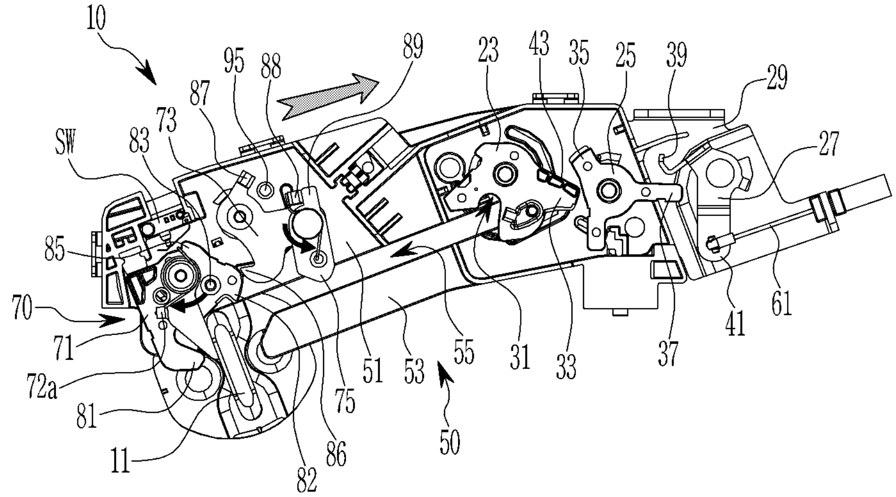
Figure 11:
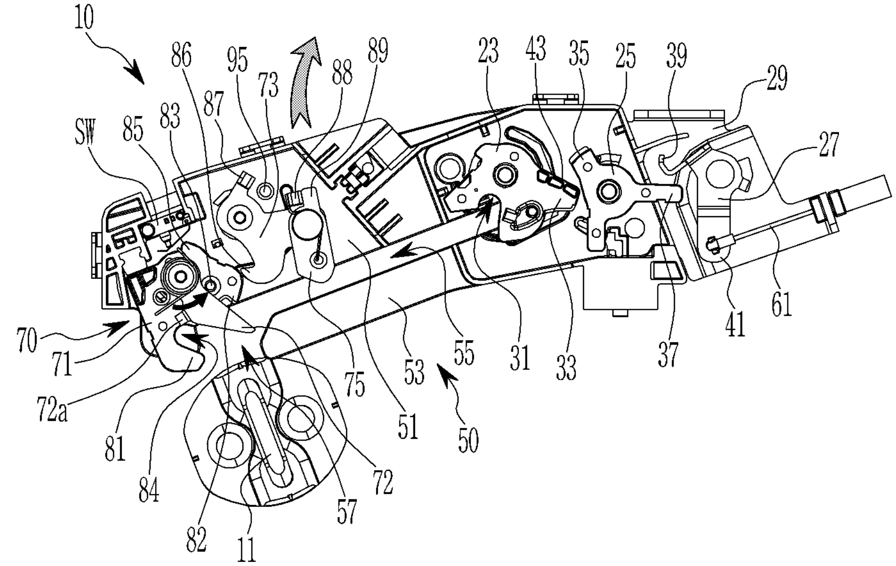

FIG. 9, FIG. 10 and FIG. 11 are plan views exemplarily illustrating step-by-step operation states of the door latch device for the vehicle according to the various exemplary embodiments of the present disclosure.

First, step ST1 of FIG. 9 illustrates a process in which the door latch device 10 starts a swing closing operation by swinging toward the striker 11 for the swing closing operation in a state where the rear door is opened.

Step ST2 of FIG. 9 illustrates a state where, after the striker 11 enters the entrance portion 57 of the guide groove 55 while the swing closing operation of the rear door proceeds, the swing closing operation of the rear door is completed and the striker 11 is inserted into the locking groove 84 of the locking claw 71 so that the door latch device 10 is locked in the rebound direction thereof.

The locking claw 71 rotates together with the locking claw link 72 in a state where the striker 11 is locked through the locking end portion 81, and the rotation of the locking claw 71 is restricted when the locking-caught end portion 82 is caught by the locking support end portion 86 of the locking pawl 73, keeping the door latch device 10 in the locked state in the rebound direction thereof.

In the present state, the switch operation end portion 85 operates the switch SW, so that the locking claw 71 recognizes that the swing closing operation of the striker 11 has been completed.

Step ST3 of FIG. 9 illustrates a process in which while a pop-up closing operation of the rear door proceeds, the striker 11 slides along the guide groove 55 and pushes one side of the release lever 75 backward to rotate release lever 75, and accordingly, the lever end portion 89 pushes the second contact end portion 88 of the locking pawl 73 to rotate the locking pawl 73 in a direction in which the locking support end portion 86 of the locking pawl 73 releases the support of the locking-caught end portion 82 of the locking claw 71.

At the present time, the locking support end portion 86 of the locking pawl 73 escapes from the locking-caught end portion 82 of the locking claw 71, and the locking claw 71 is restored to its initial position by the locking claw spring 91.

Step ST4 of FIG. 10 illustrates a state where the pop-up closing operation of the rear door is completed and the striker 11 is restrained in the restraining groove 31 of the claw lever 23 of the latch unit 20.

At the present time, as the striker 11 completely passes the release lever 75, the locking pawl 73 and the release lever 75 are restored to their initial positions by the locking pawl spring 92 and the lever spring 93, respectively.

In the present way, the closing operation of the rear door is completed through the swinging operation and the pop-up operation performed by the steps ST1 to ST4.

Meanwhile, step ST5 of FIG. 10 illustrates a state where when the connection end portion 41 of the operation lever 27 is pulled through the latch handle wire 61, the operation lever 27 is rotated and the operation end portion 39 pushes the release end portion 37 of the pawl lever 25 to rotate the pawl lever 25.

At the present time, the support end portion 35 of the pawl lever 25 escapes from the catching end portion 33 of the claw lever 23, and the claw lever 23 is restored to its initial position.

Accordingly, the striker 11 becomes movable from the restraining groove 31 of the claw lever 23 along the guide groove 55 of the pop-up guide unit 50, so that a pop-up opening operation of the rear door may be performed.

Step ST6 of FIG. 10 illustrates a state where when the striker 11 slides along the guide groove 55 of the pop-up guide unit 50 while the pop-up opening operation of the rear door proceeds, the striker 11 pushes the release lever 75 in the forward direction to rotate the release lever 75, but the lever end portion 89 rotates in a direction opposite to the second contact end portion 88 regardless of the rotation of the locking pawl 73.

Step ST7 of FIG. 11 illustrates a state where after the striker 11 slides along the guide groove 55 of the pop-up guide unit 50, the striker 11 pushes the locking claw link 72 and not the locking groove 84, which is a state where the pop-up opening operation of the rear door has been completed.

At the present time, in the state where the striker 11 pushes the locking claw link 72, the striker 11 becomes placed at a position where the rear door may be rotated for a swing opening operation.

Step ST8 of FIG. 11 illustrates a process in which the swing opening operation of the rear door proceeds.

At the present time, the striker 11 comes out of the entrance portion 57 of the pop-up guide unit 50, and at the same time, the locking claw 71 and the locking claw link 72 are restored to their initial positions by the locking claw spring 91 and the link spring 96, respectively.

A configuration of a door latch device for a vehicle according to various exemplary embodiments of the present disclosure will be described with reference to FIG. 12, FIG. 13 and FIG. 14.

FIG. 12, and FIG. 13 are perspective views exemplarily illustrating the door latch device for the vehicle according to the various exemplary embodiments of the present disclosure. FIG. 14 is a perspective view exemplarily illustrating a locking unit applied to the door latch device for the vehicle according to the various exemplary embodiments of the present disclosure.

The configuration of the door latch device 10 for the vehicle according to the various exemplary embodiments of the present disclosure differs from that according to the various exemplary embodiments in FIGS. 6-11 of the present disclosure in the release lever 75 of the locking unit 70, while all of the other components are the same between the various exemplary embodiments of the present disclosure. Thus, the detailed description of the same components will not be repeated.

That is, in the locking unit 70 according to the various exemplary embodiments of the present disclosure, the release lever 75 is disposed above the locking pawl 73 as in the various exemplary embodiments in FIGS. 6-11 of the present disclosure, but the release lever 75 is provided to be rotatable together with the locking pawl 73 through the fifth pin 73*a* and not the sixth pin 75*a*, on the other side of the first guider 51.

In the various exemplary embodiments of the present disclosure, a locking handle wire 99 is connected to one side of the release lever 75, and the release lever 75 includes a lever end portion 89 acting on the first contact end portion 87 on the other side thereof.

However, the release lever 75 according to the various exemplary embodiments is different in that the release lever 75 is formed so that one side thereof does not protrude toward the guide groove 55 of the pop-up guide unit 50, and is configured to rotate through the locking handle wire 99.

Hereinafter, a step-by-step operation of the door latch device for the vehicle according to the various exemplary embodiments of the present disclosure will be described with reference to FIG. 15, FIG. 16 and FIG. 17.

FIG. 15, FIG. 16 and FIG. 17 are plan views exemplarily illustrating step-by-step operation states of the door latch device for the vehicle according to the various exemplary embodiments of the present disclosure.

First, step ST11 of FIG. 15 illustrates a process in which the door latch device 10 starts a swing closing operation by swinging toward the striker 11 for the swing closing operation in a state where the rear door is opened.

Step ST12 of FIG. 15 illustrates a state where, after the striker 11 enters the entrance portion 57 of the guide groove 55 while the swing closing operation of the rear door proceeds, the swing closing operation of the rear door is completed and the striker 11 is inserted into the locking groove 84 of the locking claw 71 so that the door latch device 10 is locked in the rebound direction thereof.

The locking claw 71 rotates together with the locking claw link 72 in a state where the striker 11 is locked through the locking end portion 81, and the rotation of the locking claw 71 is restricted when the locking-caught end portion 82 is caught by the locking support end portion 86 of the locking pawl 73, keeping the door latch device 10 in the locked state in the rebound direction thereof.

In the present state, the switch operation end portion 85 operates the switch SW, so that the locking claw 71 recognizes that the swing closing operation of the striker 11 has been completed.

Step ST13 of FIG. 15 illustrate a process in which the striker 11 slides along the guide groove 55 while the pop-up closing operation of the rear door proceeds.

Step ST14 of FIG. 16 illustrates a state where the pop-up closing operation of the rear door is completed and the striker 11 is restrained in the restraining groove 31 of the claw lever 23 of the latch unit 20.

In the present way, the closing operation of the rear door is completed through the swinging operation and the pop-up operation performed by the steps ST11 to ST14.

Meanwhile, step ST15 of FIG. 16 illustrates a state where when the connection end portion 41 of the operation lever 27 is pulled through the latch handle wire 61, the operation lever 27 is rotated and the operation end portion 39 pushes the release end portion 37 of the pawl lever 25 to rotate the pawl lever 25.

At the present time, the support end portion 35 of the pawl lever 25 escapes from the catching end portion 33 of the claw lever 23, and the claw lever 23 is restored to its initial position.

Accordingly, the striker 11 becomes movable from the restraining groove 31 of the claw lever 23 along the guide groove 55 of the pop-up guide unit 50, so that a pop-up opening operation of the rear door may be performed.

Here, one side of the release lever 75 is pulled through the locking handle wire 99 simultaneously with the operation of the latch handle wire 61.

Accordingly, the locking support end portion 86 of the locking pawl 73 escapes from the locking-caught end portion 82 of the locking claw 71, and the locking claw 71 and the locking claw link 72 are restored to their initial positions by the locking claw spring 91 and the link spring 96, respectively.

At the present time, when the pulling force of the locking handle wire 99 is removed, the locking pawl 73 and the release lever 75 are restored to their initial positions by the locking pawl spring 92 and the lever spring 93, respectively.

Step ST16 of FIG. 16 illustrates a state where the striker 11 slides along the guide groove 55 of the pop-up guide unit 50, and the striker 11 pushes the locking claw link 72 and not the locking groove 84, which is a state where the pop-up opening operation of the rear door has been completed.

At the present time, in the state where the striker 11 pushes the locking claw link 72, the striker 11 becomes placed at a position where the rear door may be rotated for a swing opening operation.

Step ST17 of FIG. 17 illustrates a process in which the swing opening operation of the rear door proceeds.

At the present time, the striker 11 comes out of the entrance portion 57 of the pop-up guide unit 50, and at the same time, the locking claw 71 and the locking claw link 72 are restored to their initial positions by the locking claw spring 91 and the link spring 96, respectively.

Therefore, in the door latch device for a vehicle having no B-pillar according to an exemplary embodiment of the present disclosure, because the locking unit 70 including the locking claw 71, the locking claw link 72, the locking pawl 73, and the release lever 75 is arranged on the pop-up guide unit 50, the striker 11 may be locked by the locking end portion 81 of the locking claw 71 to prevent the door from rebounding during the swing closing operation of the door.

That is, even when the door is closed hard with excessive force, the striker 11 slides along the guide groove 55 of the pop-up guide unit 50 in a locked state in the locking groove 84 of the locking claw 71, so that the door proceeds with a normal pop-up closing operation.

As a result, it is possible to prevent damage to the door latch device 10, the hinge unit, and the door, which is conventionally caused by a door rebound phenomenon.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door latch apparatus for a vehicle, the door latch apparatus comprising:

a striker fixed to a vehicle body to correspond to one lower side of a door which is opened or closed with a double motion including a pop-up operation and a swing operation through a hinge unit;

a latch unit disposed on the one lower side of the door to restrain the striker or release the restraint of the striker through a claw lever and a pawl lever rotatably mounted on a body;

a pop-up guide unit including a guide groove formed by a guider formed on one side of the body to guide the striker along the one lower side of the door during the pop-up operation of the door; and a locking unit including a locking claw, a locking claw link, a locking pawl, and a release lever rotatably mounted on the pop-up guide unit to lock the striker in a rebound direction through the locking claw when the striker enters the pop-up guide unit during a swing closing operation of the door.

2. The door latch apparatus of claim 1, wherein in the locking unit:

the locking claw is pin-coupled to one side of the guider of the pop-up guide unit, and includes a locking end portion formed on a first side thereof to lock the striker and a locking-caught end portion formed on a second side thereof to restrict rotation of the locking claw in one direction, with a link pin provided adjacent to the locking-caught end portion in a cross-sectional view of the locking claw;

the locking claw link is disposed above the locking claw, and is pin-coupled to the a first side of the guider together with the locking claw while one side of the locking claw link is supported by the link pin;

the locking pawl is pin-coupled to a second side of the guider to correspond to the one side of the locking claw, and includes a locking support end portion formed on one side thereof to act on the locking-caught end portion and first and second contact end portions supported in first and second directions by a fixed damper on first and second opposite sides of the locking support end; and the release lever is pin-coupled to the one side of the locking pawl, protrudes toward the guide groove of the pop-up guide unit on a first side thereof so that the release lever is operated by the striker, and includes a lever end portion formed on a second side thereof to act on the second contact end portion.

3. The door latch apparatus of claim 2, wherein the locking claw link forms a locking groove together with the locking end portion of the locking claw when facing an entrance portion of the guide groove.

4. The door latch apparatus of claim 2, wherein the locking claw includes a switch operation end portion protruding on an opposite side of the locking end portion to operate a switch on the pop-up guide unit.

5. The door latch apparatus of claim 2, wherein the locking unit further includes:

a locking claw spring fitted onto a pin of the locking claw under the guider to elastically support the locking claw in the first and second directions;

a locking pawl spring fitted onto the pin of the locking pawl under the guider to elastically support the locking pawl in a direction in which the locking support end portion of the locking pawl supports the locking-caught end portion of the locking claw;

a link spring fitted onto the pin of the locking claw on the locking claw link to elastically support the locking claw link toward the link pin with respect to the locking claw; and a lever spring fitted onto a pin of the release lever on the release lever to elastically support the release lever in a direction in which one side of the release lever protrudes toward the guide groove.

6. The door latch apparatus of claim 5, wherein in a state where the link spring is fitted onto the pin of the locking claw, a first end portion of the link spring is supported by the one side of the locking claw, and a second end portion of the link spring is supported by a spring support end portion formed in the locking claw link.

7. The door latch apparatus of claim 5, wherein in a state where the lever spring is fitted onto the pin of the release link, a first end portion of the lever spring is supported by the second contact end portion of the locking pawl, and a second end portion of the lever spring is inserted into a spring hole formed in a cross-sectional view of the release lever.

8. The door latch apparatus of claim 2, wherein the locking unit further includes:

a locking claw damper provided on the guider while supporting the one side of the locking claw to suppress the rotation.

9. The door latch apparatus of claim 2, wherein the locking unit further includes:

a locking pawl damper provided on the guider to correspond between the first and second contact end portions of the locking pawl.

10. The door latch apparatus of claim 2, wherein in the locking unit, the release lever is disposed above the locking pawl and pin-coupled to the second side of the guider together with the locking pawl, a locking handle wire is connected to a first side of the release lever, and the release lever includes a lever end portion formed on a second side thereof to act on the first contact end portion.

11. The door latch apparatus of claim 1, wherein the door is a rear door and the one lower side of the door is one lower front side of the rear door.

* * * * *